US011079786B2

(12) United States Patent
Sticht

(10) Patent No.: US 11,079,786 B2
(45) Date of Patent: Aug. 3, 2021

(54) PREDICTIVE METHOD, APPARATUS AND PROGRAM PRODUCT FOR WEATHER ADJUSTMENT OF RESOURCE USAGE DATA

(71) Applicant: Christopher Sticht, Key Largo, FL (US)

(72) Inventor: Christopher Sticht, Key Largo, FL (US)

( * ) Notice: Subject to any disclaimer, the term of this patent is extended or adjusted under 35 U.S.C. 154(b) by 116 days.

(21) Appl. No.: 16/434,767

(22) Filed: Jun. 7, 2019

(65) Prior Publication Data
US 2020/0387185 A1    Dec. 10, 2020

(51) Int. Cl.
*G05F 1/66* (2006.01)
*G01D 4/00* (2006.01)
*G01W 1/02* (2006.01)

(52) U.S. Cl.
CPC .............. *G05F 1/66* (2013.01); *G01D 4/004* (2013.01); *G01W 1/02* (2013.01)

(58) Field of Classification Search
CPC ......... H02J 3/003; H02J 2203/20; G05F 1/66; G01W 1/02; G01D 4/004
See application file for complete search history.

(56) References Cited

U.S. PATENT DOCUMENTS

| 5,491,629 A | 2/1996 | Fox et al. |
| 6,577,962 B1 | 6/2003 | Afshari |
| 8,229,866 B2 | 7/2012 | Alaniz |
| 9,251,243 B2 | 2/2016 | Sticht |
| 2004/0254899 A1 | 12/2004 | Abe et al. |

(Continued)

FOREIGN PATENT DOCUMENTS

EP    2312506    4/2011

OTHER PUBLICATIONS

Medium-Term Electric Load Forecasting Using Multivariable Linear and Non-Linear Regression Nazih Abu-Shikhah , Fawwaz Elkarmi , Osama M. Aloquili, Smart Grid and Renewable Energy, 2011, 2, 126-135, May 2011.

(Continued)

*Primary Examiner* — Mohammad Ali
*Assistant Examiner* — Vincent W Chang
(74) *Attorney, Agent, or Firm* — Maier & Maier, PLLC

(57) ABSTRACT

A method for weather adjustment of an electrical utility system. Data defining sequential events in the utility system is obtained, each event identified by three coordinate values: hour of day, recorded temperature, and resource usage. A three-dimensional topological surface is generated from the coordinate value, by plotting the resource usage against the hour and temperature in a three-dimensional space. A polynomial equation having calculated coefficients and a highest degree of six for each variable is generated to define the topological surface, wherein the polynomial equation expresses the resource usage as a tenth-degree polynomial function of hour of day and temperature. A future load on components of the system at a particular temperature and hour of day is determined by applying the coefficients to the coordinate values for the particular temperature and hour, and modifying the functionality of components of the electrical utility system based on the determined future load.

18 Claims, 4 Drawing Sheets

(56) References Cited

U.S. PATENT DOCUMENTS

| | | |
|---|---|---|
| 2005/0090995 A1* | 4/2005 | Sonderegger ............. H02J 3/00 702/57 |
| 2006/0167591 A1 | 7/2006 | McNally |
| 2008/0228325 A1* | 9/2008 | Schindler ............... G06Q 10/04 700/291 |
| 2011/0190951 A1 | 8/2011 | Lee |
| 2012/0173456 A1 | 7/2012 | Hirl et al. |
| 2013/0096983 A1* | 4/2013 | Forbes ............... G06Q 30/0202 705/7.31 |
| 2013/0304269 A1* | 11/2013 | Shiel ...................... G06Q 50/06 700/291 |
| 2013/0346034 A1* | 12/2013 | Sticht .................... G06Q 30/02 703/2 |
| 2016/0140268 A1* | 5/2016 | Sticht ..................... H02J 3/004 703/1 |
| 2016/0162606 A1* | 6/2016 | Sticht ................. G06Q 30/0202 703/1 |
| 2019/0312429 A1* | 10/2019 | Vitullo ..................... H02J 3/00 |

OTHER PUBLICATIONS

A novel modeling approach for hourly forecasting of long-term electric energy demand Ümmühan Basaran Filik, Ömer Nezih Gerek, Mehmet Kurban, Energy Conversion and Management 52 (2011) 199-211, Jul. 2010.

\* cited by examiner

PREDICTIVE METHOD, APPARATUS AND PROGRAM PRODUCT FOR WEATHER ADJUSTMENT OF RESOURCE USAGE DATA

BACKGROUND

Prediction of demands on resources such as electrical power, water supply, communications infrastructure, and the like, is of importance to planners for utilities and other bodies concerned with growth and meeting the demands of growth. Technologies for such predictions have existed and are in use, and have been found to suffer deficiencies in adaptability to data capture and analysis. Typically, forecasting techniques have provided some reliable accuracy over limited spans of time and little accuracy over longer spans of time.

Until now, system peak hour data has been sufficient for planning the electric grid, due to planners allowing for substantial margin for error. However, with the changing electric utility environment, it is becoming necessary to extract more usage from the existing infrastructure. As a consequence, there is a need to have a greater understanding of electrical loading on different equipment such as transformers, feeder lines, customer transformers, and so forth.

The first step in utility system planning is to estimate the capability of the system to serve expected demand. This requires a forecast that provides information about expected future usage.

Generally, in first-world electric utility systems, a relationship exists between weather conditions and demand for electric power, due to the use of air conditioning and electric heat. Such use varies throughout the day and throughout the year due to customer behavior and the variability of temperature. As the temperature rises in the summer, the demand for air conditioning goes up, increasing the demand for electricity. As the temperature goes down in the winter, the demand for electric heat goes up which likewise increases the demand for electricity. This relationship has been long understood by distribution system planners and is referred to as weather sensitivity.

A significant influence on weather sensitivity, and in particular, on temperature sensitivity, is the presence of building spaces that are occupied by humans and that require temperature correction to make the space comfortable for humans to inhabit. Spaces such as residential homes, office spaces, other commercial spaces, and the like, tend to have high weather sensitivity. In contrast, spaces with low temperature sensitivity include industrial plants, factories, and other locales where a significant portion of the load is due to motors and motor driven processes, as motors require little or no air-conditioning. Thus, the more a circuit or station is made up of residential or small commercial load, the more weather sensitive that circuit or station tends to be.

In the past, distribution planners concentrated on system peaks, such as the hottest day of the summer or the coldest day of the winter. Such peaks typically represented the worst-case scenarios that the system would encounter throughout the year. By ensuring that the worst-case scenarios were covered, system planners were able to ensure that the capacity requirements were met throughout the year. Therefore, the focus on weather normalization adjustment typically has been in relation to the system peaks.

Part of the challenge in such weather adjustment is that load materializes over a wide range of temperatures. The reason for this is that different clients tend to turn on their air conditioner or heater at different temperatures. This concept is often referred to as heat buildup. This makes it challenging to find a clean relationship between temperature and load. Overcoming this challenge has historically involved the use of cooling degree days and heating degree days. These are values that can be calculated to better represent the quantity of heat energy.

Heating Degree Days (HDD) is a measurement designed to quantify the demand for energy needed to heat a building. HDD is derived from measurements of outside air temperature. The heating requirements for a given building at a specific location are considered to be directly proportional to the number of HDD at that location. Cooling Degree Days (CDD) similarly quantifies demand for air conditioning.

Degree Days are based on the assumption that when the outside temperature is 65° F., people do not need heating or cooling to be comfortable. Degree days are calculated by finding the difference between the daily temperature mean, (i.e., the sum of the high temperature and the low temperature, divided by two) and 65° F. If the temperature mean is above 65° F., we subtract 65 from the mean and the result is Cooling Degree Days. If the temperature mean is below 65° F., we subtract the mean from 65 and the result is Heating Degree Days.

Correcting historical load readings to standard (normal) weather conditions, known as weather normalization adjustment, is a recommended practice that leads to more accurate and useful load forecasts. Weather normalization adjustment requires a formula to relate ambient temperature and demand. Temperature and demand are analyzed, and the relationship is used to adjust historical readings to normalized temperatures. Known techniques primarily attempt to find a relationship between the annual peak load on a circuit or station, and the cooling degree day measurement of the day that the peak occurred. The idea is to plot data points of cooling degree days on the x-axis against the peak load of the corresponding day on the y-axis. Once the points of several years of data have been plotted, a trend-line or a regression line is found for the data points. FIG. 1 shows the most common relationship found in the literature, where the dots are the load readings throughout the year plotted against the temperature at which the load reading occurred. The line(s) represent the best fit formula of the relationship between temperature and electric load demand.

The R-squared value, also known as the coefficient of determination, of a trend-line or line of regression is an indication of how good of a fit is the trend-line to the actual data. An R-squared value of 80% or more is an indication of a good fit. The goodness of fit of a statistical model describes how well statistical model fits a set of observations. Measures of goodness of fit typically summarize the discrepancy between observed values and the values expected under the model in question.

The methods used thus far to adjust load readings using temperature and/or other weather factors have not shown to be suited to the data set. It has often been the case that the trend-line poorly fits the data point, as shown in FIG. 2. It is common for the regression model to have an R-squared value far below 80%; the state of the art is such that it is not unusual to see R-squared values in the range of 15% to 40%. Despite its shortcomings, such models were better than the alternative, which was no model at all.

The leaders in this field have consistently followed a similar approach, an example of which is shown in FIG. 3. Examples may be found in the relevant literature, for example, J. S. McMenamin, "Weather Normalization," Itron, 2005; H. L. Willis, "Power Distribution Planning Reference Book Second Edition, Revised and Expanded," Marcel Dekker, Inc., New York, 2004.

The weather adjustment algorithms thus far are primarily looking at the peak load of the highest load day in the year. Some cases utilize cooling degree days for the calculation, while others focus on temperature. In most cases, the algorithms attempt to find a linear fit between temperature and load.

There is a great deal known about electric loads, but there has not yet been a way to cleanly represent electrical demand sensitivity to weather in the form of an equation that fits the data well over periods of weeks, months or years. As such, there has been a need for accurate weather adjustment of load data, yet nothing has been found to work with sufficient accuracy, reliability and simplicity to be of much use to those who plan the electric grid. What is presented here is a methodology that is both simple enough and accurate enough to be of value for planning the power grid.

Disclosed and taught herein is a new technology for such weather adjustment which relies upon and implements a topologic space and surface analysis enabling generation of more accurate predictive values for resource demand.

SUMMARY

A method for weather adjustment of an electrical utility system, a method for distribution automation of an electrical utility system, and an electrical utility system utilizing these methods are disclosed. Data defining a plurality of sequential events in the electrical utility system is obtained, each event identified by three coordinate values: hour of day, recorded temperature, and resource usage. A three-dimensional topological surface is generated from the three coordinate values, by plotting the resource usage against the hour of day and the temperature in a three-dimensional space. A polynomial equation defining the topological surface is generated, wherein the polynomial equation expresses the resource usage as a tenth-degree polynomial function of hour of day and temperature, with each independent variable having a highest degree of six, and the polynomial equation having a set of calculated coefficients. A future load on components of the electrical utility system at a particular temperature and hour of day is determined, by applying the calculated coefficients to the coordinate values for the particular temperature and hour of day, and modifying the functionality of one or more components of the electrical utility system based on the determined future load.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 4b is an isometric view of the surface in 4a;

DETAILED DESCRIPTION

Figure 1:
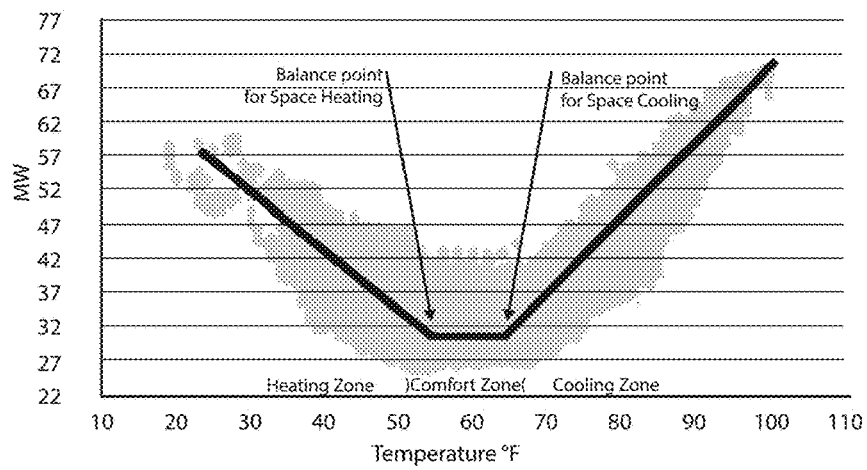
FIG. 1 shows an example of a temperature sensitivity chart according to the prior art, which does not take into account the time of day.
Figure 2:
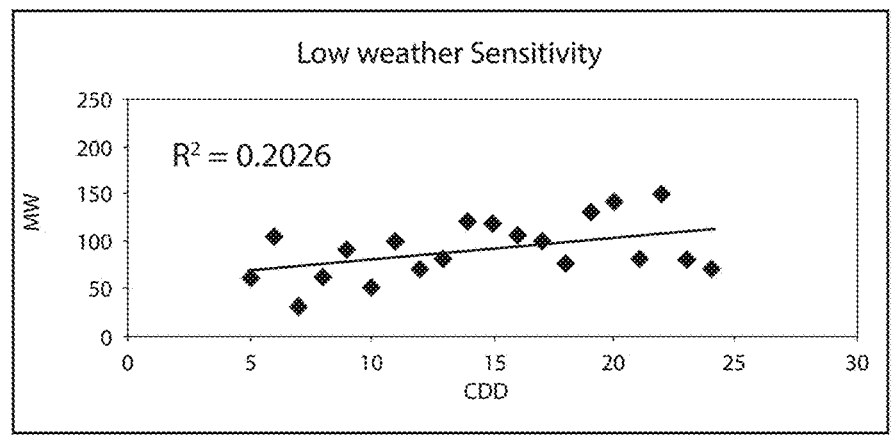
FIG. 2 shows another example of a temperature sensitivity chart according to the prior art, utilizing cooling degree days.
Figure 3:
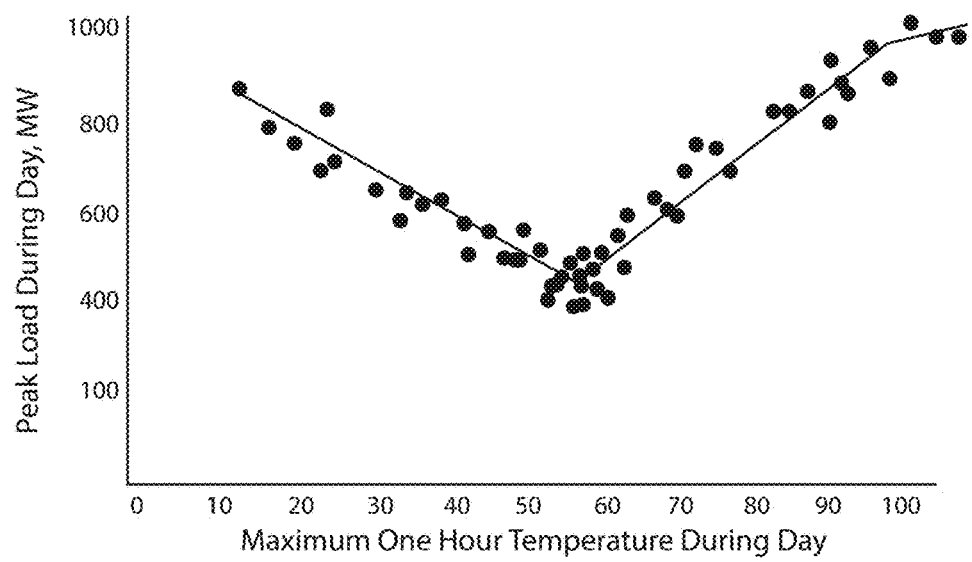
FIG. 3 shows another example of a temperature sensitivity chart according to the prior art.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Apportioned-Time Intermediate and Long-term Data Analysis (ATILDA) is a time data analysis method that converts massive amounts of time-series data into a mathematical equation which can be more readily used by and interpreted by humans. The methodology can be used for analyzing data concerning human utilization of resources such as electricity, water, gas, communication etc. ATILDA's origins are in electric utility system capacity planning and are extremely well suited for this purpose. The ATILDA method processes raw data and converts it to a mathematical function. One year of raw data from hourly SCADA data (8760 data points) or one year of AMI data (>35,000 data points) can be represented with good accuracy with a simple mathematical equation.

ATILDA takes advantage of natural patterns within load data. Consider electricity usage at home. In the middle of the night, for example, there is very little electricity being used. The lights are turned off, the residents are sleeping and no appliances are running. In the morning, as people wake up and get ready for their day, the lights are turned on; appliances such as the stove may be used to cook breakfast; and electricity usage increases from its nighttime levels. As people go to work, the lights are turned off and the appliances are shut down; as a result, electricity usage in the late morning will tend to decline or plateau. In the evening, as people come home from work, many appliances and lights are again turned on. This is when the system peak occurs, typically around 5 or 6 PM. As the evening winds down into night, electricity usage again decreases. This creates a double hump pattern, on a daily basis, in the load data.

Furthermore, when looking at the data in an annual basis, it is seen that in the winter there is an increase in demand for electricity due to the use of electric heat. In the summer, there is also an increase in demand for electricity due to the use of air conditioning. Conversely, in the spring and fall, it is much less likely that electric heat or air conditioning is running. This creates another double hump pattern, on a seasonal basis, in the load data.

Figure 4A:
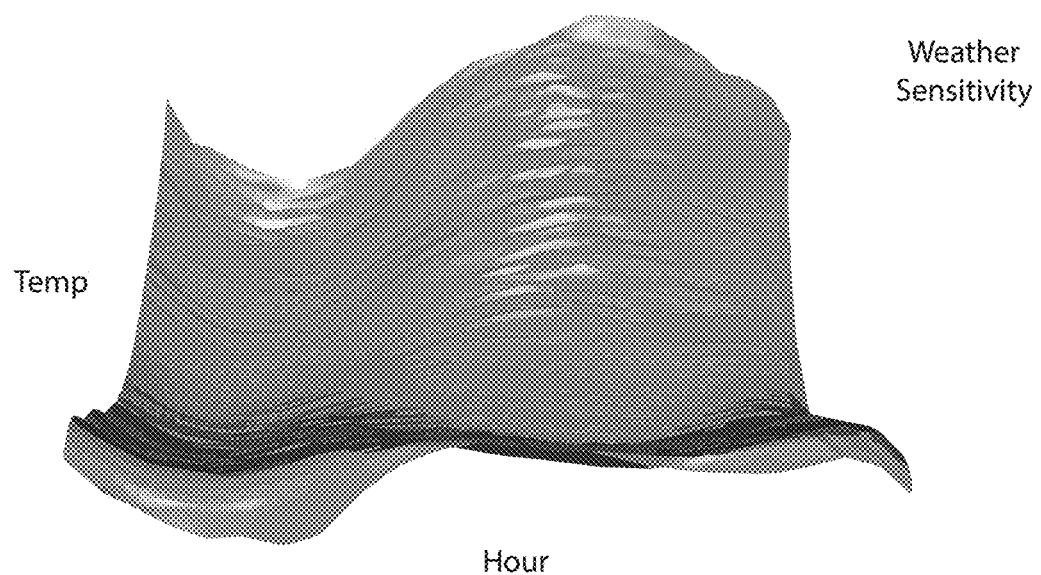
FIG. 4a is a representation of an exemplary three-dimensional topologic surface generated from electrical load and temperature data.
Figure 4B:
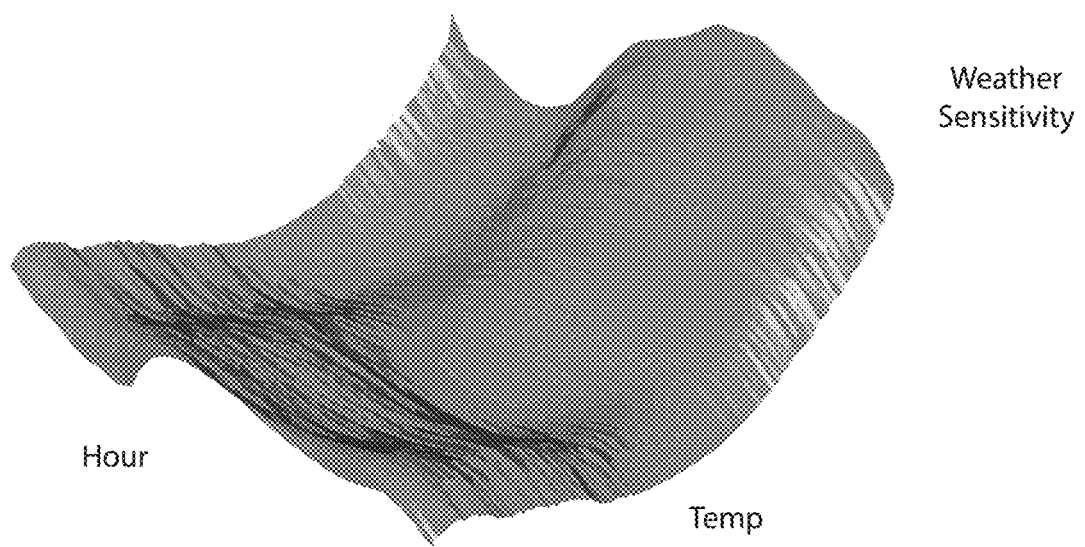
Figure 5:
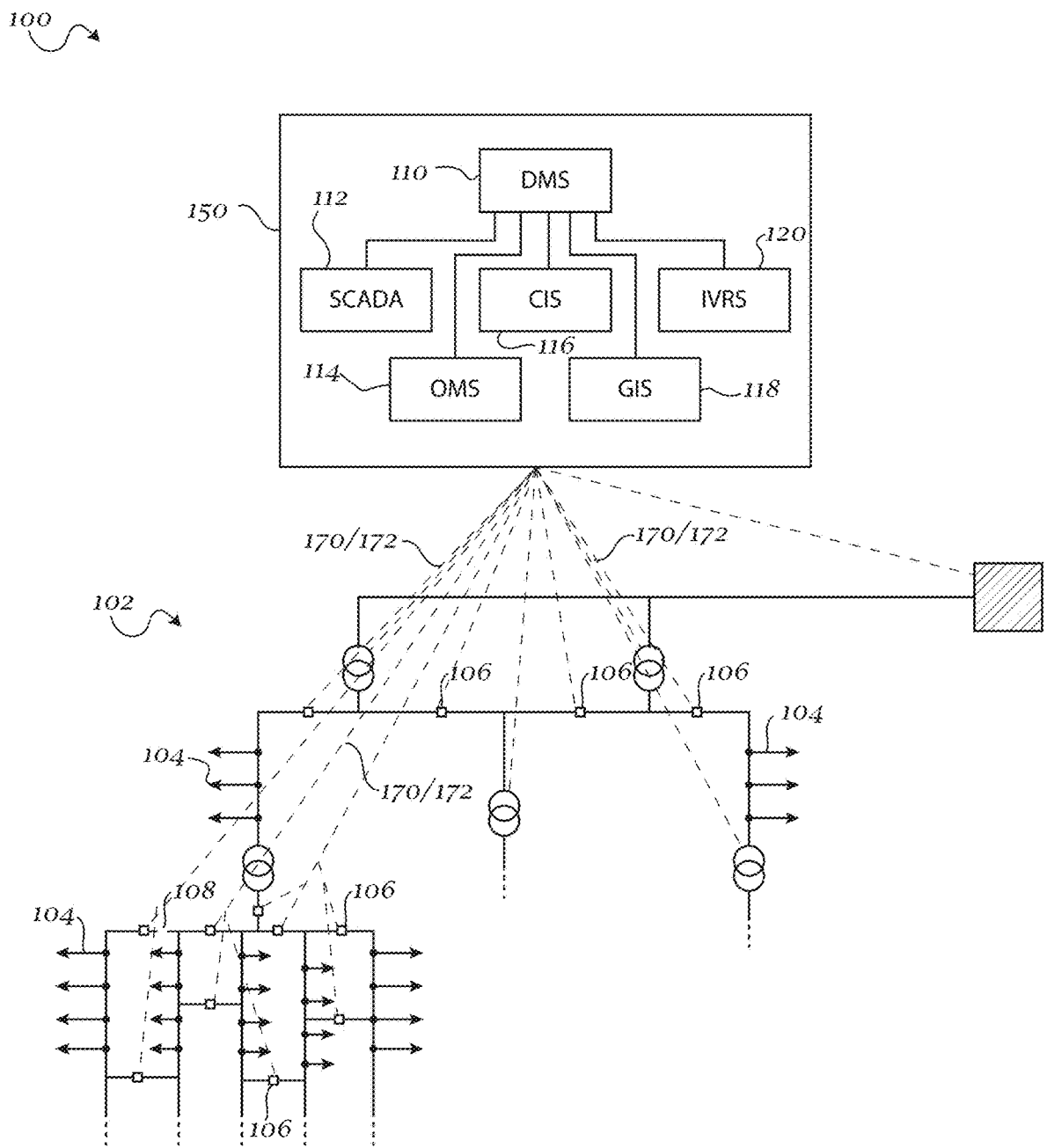
FIG. 5 shows an exemplary distribution management system and an exemplary electrical utility system.

When looking at load data in a 2-dimensional time series it is very difficult to see or recognize these patterns. The starting point for ATILDA is to reorganize the data to take advantage of the known patterns within the data. By taking 24 hours of data and stacking it along a third axis and then repeating the same for each day of the year, a three-dimensional load surface is created, for example as illustrated in FIGS. 4a-4b.

The technique of the present invention, implemented in a computer system such as described below, is a method which stores in the system memory data defining a plurality of sequential events, with each event being identified by three coordinate values. In most resource usage prediction applications, the data will be usage or demand levels, temperature (of the specific hour) and hour. The temperature is preferably recorded as simply the temperature in Celsius, Kelvin, Fahrenheit, Heating Degree Days, Cooling Degree Days or other units of temperature. Hour is preferably recorded simply as hour of day on a twenty-four-hour clock. A year of demand level, temperature and hour data is used for in the analysis. Thus, the series of sequential events may be 8760, for hourly data for a year. However, as will become clear from what follows, other intervals may be selected while the technique remains applicable. Thus, if the usage demands suggest or require, data may be captured on a quarter hour or minute by minute basis. The range of sequential events is from eight thousand to six hundred thousand events recorded in data.

In any event, by executing program code written in accordance with this invention on the processor and using the stored data, a three-dimensional topologic space is generated. In generating this space, temperature may be plotted along the X axis, for example, while hour is plotted along the Y axis, and resource usage or demand is plotted along the Z axis. From the generated space, a polynomial equation is generated which defines the topologic surface or space (See FIGS. 4a-4b). The illustrated topologic surface is a sheet. As used here, the terms "topologic space" and "topologic surface" are intended to have the broad meaning understood by mathematicians. Then, applying the equation, a predicted value for a future event coordinate value is generated. This is done in a computer apparatus where a processor executes program code, as a method where the operations are performed by a computer system, and when a program product is accessed and executed by a computer system.

The methodology presented here forms a single discrete variable equation that represents the sensitivity of load to temperature for electric distribution system loads with accuracy sufficient to be of value. The equation is in the form of a single polynomial equation where each polynomial coefficient can be interpreted in such a way as to provide deeper understanding of the load behavior.

Another value to having the weather adjustment represented by a single equation is that the load for 8760 hours of data points can be represented as 35 coefficients with high accuracy.

1. Read one year of hourly load data (8760 hours)
   a. convert data to:
      i. hour of day
      ii. temperature
   b. organize into three columns organized by hour of year
      i. X=hour of day
      ii. Y=temperature
      iii. Z=load reading for hour
2. Calculate coefficients by performing a multiple regression on X, Y, Z using one of the following forms of regression:
   a. least squares regression
   b. robust regression
   c. resistant regression
3. use equation, 4th order (for temperature) by 6th order (for hour of day) three-dimensional polynomial (topologic surface):

$$z = B0 + B1 \cdot x + B2 \cdot x^2 + B3 \cdot x^3 + B4 \cdot x^4 + B5 \cdot x^5 + B6 \cdot x^6 + B7 \cdot y + \\ B8 \cdot x \cdot y + B9 \cdot x^2 \cdot y + B10 \cdot x^3 \cdot y + B11 \cdot x^4 \cdot y + B12 \cdot x^5 \cdot y + \\ B13 \cdot x^6 \cdot y + B14 \cdot y^2 + B15 \cdot x \cdot y^2 + B16 \cdot x^2 \cdot y^2 + B17 \cdot x^3 \cdot y^2 + \\ B18 \cdot x^4 \cdot y^2 + B19 \cdot x^5 \cdot y^2 + B20 \cdot x^6 \cdot y^2 + B21 \cdot y^3 + \\ B22 \cdot x \cdot y^3 + B23 \cdot x^2 \cdot y^3 + B24 \cdot x^3 \cdot y^3 + B25 \cdot x^4 \cdot y^3 + \\ B26 \cdot x^5 \cdot y^3 + B27 \cdot x^6 \cdot y^3 + B28 \cdot y^4 + B29 \cdot x \cdot y^4 + \\ B30 \cdot x^2 \cdot y^4 + B31 \cdot x^3 \cdot y^4 + B32 \cdot x^4 \cdot y^4 + B33 \cdot x^5 \cdot y^4 + \\ B34 \cdot x^6 \cdot y^4,$$

where the Bs are the coefficients calculated by the regression.

The calculated coefficients then are used to calculate predictions for resource usage/demands (such as electrical loads) based on the equation for the topologic surface. The equation coefficients can be calculated even with several hours of load data missing. To get the most accuracy in the calculated coefficients it is best to have a couple of thousand load readings out of the 8760 hours in the year. The more load readings there are in the original calculation of the coefficients the better estimations will be.

The surface for each system component (i.e. customer load, transformer load, feeder load, substation load) is different but the topologic space and surface for each component has a characteristic shape represented by a unique set of polynomial coefficients. The characteristic polynomial coefficient set is used to represent a normalized data curve for each system component in a compact form. By storing and presenting the characteristic coefficients for each system component, insight can be gained into the load behavior without having to individually analyze all 8760 original data points.

The method described herein may be utilized in improving the functionality of computer automation of electrical systems. Distribution automation is a real-time operational system that automatically reconfigures circuits when portions of a circuit are interrupted. A Distribution Management System (DMS) 110 is designed to monitor and control the entire electric distribution network efficiently and reliably. The DMS 110 acts as a decision support system to assist the electric system control center 150 and field operating personnel with the monitoring and control of the electric distribution system 100. It improves the reliability and quality of service by way of reducing outages, minimizing outage time, and maintaining acceptable frequency and voltage levels. In this context, "DMS" is being used as a general term for a Computer-Aided Electric Grid Management System (CAEGMS) which may include a Distribution Management System (DMS), an Energy Management System (EMS), a Building Management System (BMS) and/or other systems designed to manage large and small electric grids and systems.

Distribution utilities have been comprehensively integrating these systems, including various enterprise systems such as: Supervisory Control and Data Acquisition (SCADA) systems 112, Outage Management Systems (OMS) 114, Customer Information Systems (CIS) 116, Geographical Information Systems (GIS) 118 and Interactive Voice Response Systems (IVRS) 120. The OMS, for example, have a network component/connectivity model of the distribution system. By combining the locations of outage calls from customers 104 with knowledge of the locations of the protection devices (such as circuit breakers) 106 on the network 102, a rule engine is used to predict the locations of outages 108. The DMS and its various components may be implemented as computer-readable code stored on a desired machine-readable storage medium and executed by a processor.

The DMS accesses real-time data from the various systems listed above and provides the information on a single console at the control center in an integrated manner. DMSs are growing to automate the complete sequences of circuit restoration when outages occur. They also provide an end to end, integrated view of the entire distribution spectrum, allowing centralized control to be managed electronically. These DMSs require detailed component/connectivity models and schematics.

Communications 170 concerning outages, loads, switch open/closed states, and so forth, is received by the DMS at the distribution control center. The DMS must then analyze the current configuration of the system, the loading of each circuit, and the available capacity of the circuit. The DMS 110 then uses programmed logic to determine how to best reconfigure the system 100 to restore as many customers to power as possible without overloading any circuit involved. Commands 172 are then sent by the DMS to the communication-controlled circuit breakers and switches to execute the restoration plan.

Essential to the functioning of the DMS is information regarding the expected load on each circuit and/or circuit section in the near future (for example, during the next week or weeks) so as to ensure that switching decisions that are executed presently do not result in an overload in the near-future period (for example, the next few hours, days, or weeks).

In this context, the method described herein may be used to forecast load on the portion of the circuit that is being transferred from one circuit to another. The forecast may be on the order of hours or days or the planning context of years. The distribution system may be reconfigured in real time, and, therefore, this may be a real time implementation of the algorithm being used to reconfigure the electric grid.

Figure 6:
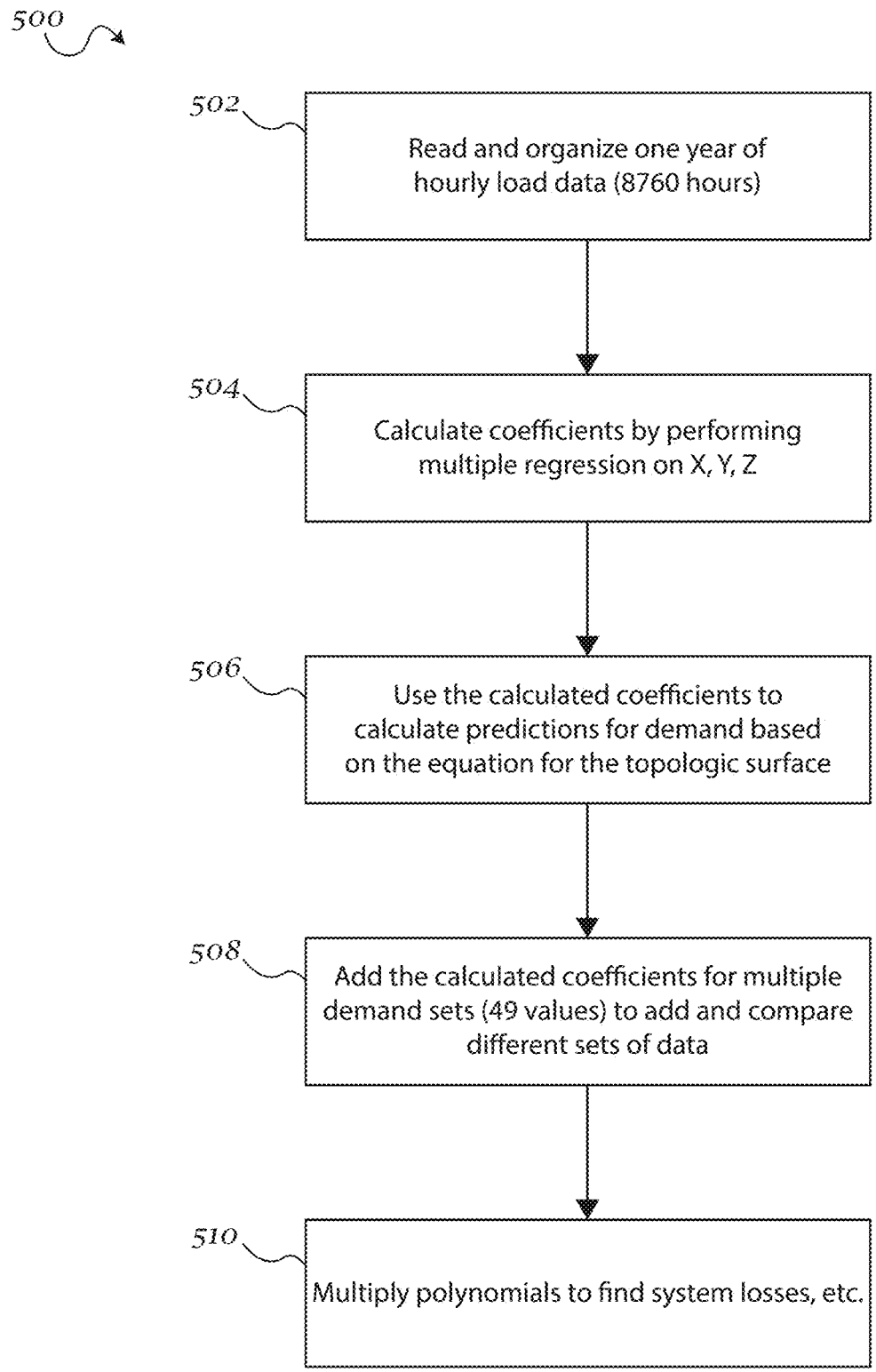
FIG. 6 shows an exemplary process for weather adjustment of resource usage data.

The process 600 is summarized in the chart of FIG. 6. At step 602, communications are received by the DMS from the various components of the electrical grid. The data from the received communications is then read and organized, at step 604. This may be any amount of data, for example 24, 48, 168, 720, 8760 hours of load data, or any other desired amount of data. At step 606, the coefficients are calculated by performing a regression on the X, Y, Z terms of the three-dimensional topologic space. At step 608, the calculated coefficients are used to perform predictions. Then, at step 610, the calculated coefficients are added to compare differing sets of data. At step 612, the polynomials may be multiplied, if desired.

A matrix of the coefficients is:

TABLE 1

|  | 1 | X | $X^2$ | $X^3$ | $X^4$ | $X^5$ | $X^6$ |
|---|---|---|---|---|---|---|---|
| 1 | B0 | B1 | B2 | B3 | B4 | B5 | B6 |
| Y | B7 | B8 | B9 | B10 | B11 | B12 | B13 |
| $Y^2$ | B14 | B15 | B16 | B17 | B18 | B19 | B20 |
| $Y^3$ | B21 | B22 | B23 | B24 | B25 | B26 | B27 |
| $Y^4$ | B28 | B29 | B30 | B31 | B32 | B33 | B34 |

Prediction is accomplished by using the equation above. Calculating the result of the equation using x (temperature) and y (the hour of the day) gives a result for z (the load). This is the load for the temperature and hour of interest. At step 614, the DMS may send appropriate commands to the components of the electrical grid. Such components can include breakers, switches, reclosers, fuses, sectionalizers, customer meters, service transformers, circuits/feeders (part or whole), spot secondary networks, secondary-network grids, primary networks, substation buses, substations, substation power transformers, transmission/sub-transmission lines, transmission networks, planning areas, generators, generation facilities, sets of generation facilities, utility systems or interconnected systems of utility systems. The commands can be based on the predicted loads that are calculated in the preceding steps. The configuration of the electrical grid is can thus be automatically modified in real time, based on real-time calculations of predicted loads.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for weather adjustment of an electrical utility system, comprising:
   obtaining data defining a plurality of sequential events in the electrical utility system, each event identified by three coordinate values, the three coordinate values being hour of day, recorded temperature, and resource usage of the electrical utility system;
   generating from the three coordinate values a three-dimensional topological surface by plotting the resource usage against the hour of day and the temperature in a three-dimensional space;
   generating a polynomial equation defining the topological surface, wherein the polynomial equation expresses the resource usage as a tenth-degree polynomial function of hour of day and temperature, with each independent variable having a highest degree of six, the polynomial equation having a set of calculated coefficients;
   determining a future load on a component of the electrical utility system at a particular temperature and hour of day by applying the calculated coefficients to the coordinate values for the particular temperature and hour of day; and
   modifying the functionality of one or more components of the electrical utility system based on the determined future load.

2. The method of claim 1, wherein the polynomial equation defines the resource usage coordinate value by application of the coefficients to the coordinate values for hour of day and temperature.

3. The method of claim 1, wherein the plurality of sequential events totals a number of events in the range between 24 and 600000.

4. The method of claim 1, wherein the load is one or more of customer load, transformer load, feeder load, and substation load.

5. The method of claim 1 wherein the component is one or more of a breaker, a switch, a recloser, a fuse, a sectionalizer, a customer meter, a service transformer, a circuit/feeder (part or whole), a spot secondary-network, a secondary-network grid, a primary-network, a substation bus, a substation, a substation power transformer, a transmission/ sub-transmission line, a transmission network, a planning area, a generator, a generation facility, sets of generation facilities, a utility system or an interconnected system of utility systems.

6. The method of claim 1, wherein the tenth-degree polynomial function is:

$$z=B0+B1 \cdot x+B2 \cdot x^2+B3 \cdot x^3+B4 \cdot x^4+B5 \cdot x^5+B6 \cdot x^6+B7 \cdot y+$$
$$B8 \cdot x \cdot y+B9 \cdot x^2 \cdot y+B10 \cdot x^3 \cdot y+B11 \cdot x^4 \cdot y+B12 \cdot x^5 \cdot y+$$
$$B13 \cdot x^6 y+B14 \cdot y^2+B15 \cdot x \cdot y^2+B16 \cdot x^2 \cdot y^2+B17 \cdot x^3 y^2+$$
$$B18 \cdot x^4 \cdot y^2+B19 \cdot x^5 \cdot y^2+B20 \cdot x^6 \cdot y^2+B21 \cdot y^3+$$
$$B22 \cdot x \cdot y^3+B23 \cdot x^2 \cdot y^3+B24 \cdot x^3 \cdot y^3+B25 \cdot x^4 \cdot y^3+$$
$$B26 \cdot x^5 \cdot y^3+B27 \cdot x^6 \cdot y^3+B28 \cdot y^4+B29 \cdot x \cdot y^4+$$
$$B30 \cdot x^2 \cdot y^4+B31 \cdot x^3 \cdot y^4+B32 \cdot x^4 \cdot y^4+B33 \cdot x^5 \cdot y^4+$$
$$B34 \cdot x^6 \cdot y^4,$$

wherein Bs are the calculated coefficients.

7. A method for system automation of an electrical utility system, comprising:
obtaining data defining a plurality of sequential events in a portion the electrical utility system, each event identified by three coordinate values, the three coordinate values being hour of day, recorded temperature, and resource usage of the electrical utility system;
generating from the three coordinate values a three-dimensional topological surface by plotting the resource usage against the hour of day and the temperature in a three-dimensional space;
generating a polynomial equation defining the topological surface, wherein the polynomial equation expresses the resource usage as a tenth-degree polynomial function of hour of day and temperature, with each independent variable having a highest degree of six, the polynomial equation having a set of calculated coefficients;
determining a future load on a component of the electrical utility system at a particular temperature and hour of day by applying the calculated coefficients to the coordinate values for the particular temperature and hour of day; and
modifying the functionality of one or more components of the electrical utility system based on the determined future load.

8. The method of claim 7, wherein the polynomial equation defines the resource usage coordinate value by application of the coefficients to the coordinate values for hour of day and temperature.

9. The method of claim 7, wherein the plurality of sequential events totals a number of events in the range between 24 and 600000.

10. The method of claim 7, wherein the load is one or more of customer load, transformer load, feeder load, and substation load.

11. The method of claim 7 wherein the component is one or more of a breaker, a switch, a recloser, a fuse, a sectionalizer, a customer meter, a service transformer, a circuit/feeder (part or whole), a spot secondary-network, a secondary-network grid, a primary-network, a substation bus, a substation, a substation power transformer, a transmission/sub-transmission line, a transmission network, a planning area, a generator, a generation facility, sets of generation facilities, a utility system or an interconnected system of utility systems.

12. The method of claim 7, wherein the tenth-degree polynomial function is:

$$z=B0+B1 \cdot x+B2 \cdot x^2+B3 \cdot x^3+B4 \cdot x^4+B5 \cdot x^5+B6 \cdot x^6+B7 \cdot y+$$
$$B8 \cdot x \cdot y+B9 \cdot x^2 \cdot y+B10 \cdot x^3 \cdot y+B11 \cdot x^4 \cdot y+B12 \cdot x^5 \cdot y+$$
$$B13 \cdot x^6 y+B14 \cdot y^2+B15 \cdot x \cdot y^2+B16 \cdot x^2 \cdot y^2+B17 \cdot x^3 y^2+$$
$$B18 \cdot x^4 \cdot y^2+B19 \cdot x^5 \cdot y^2+B20 \cdot x^6 \cdot y^2+B21 \cdot y^3+$$
$$B22 \cdot x \cdot y^3+B23 \cdot x^2 \cdot y^3+B24 \cdot x^3 \cdot y^3+B25 \cdot x^4 \cdot y^3+$$
$$B26 \cdot x^5 \cdot y^3+B27 \cdot x^6 \cdot y^3+B28 \cdot y^4+B29 \cdot x \cdot y^4+$$
$$B30 \cdot x^2 \cdot y^4+B31 \cdot x^3 \cdot y^4+B32 \cdot x^4 \cdot y^4+B33 \cdot x^5 \cdot y^4+$$
$$B34 \cdot x^6 \cdot y^4,$$

wherein Bs are the calculated coefficients.

13. An electrical utility system, comprising:
a plurality of electrical grid components; and
a distribution management system;
wherein the distribution management system is adapted to:
receive communications from the electrical grid components;
obtain data defining a plurality of sequential events in a portion the electrical utility system, each event identified by three coordinate values, the three coordinate values being hour of day, recorded temperature, and resource usage of the electrical utility system;
generate from the three coordinate values a three-dimensional topological surface by plotting the resource usage against the hour of day and the temperature in a three-dimensional space;
generate a polynomial equation defining the topological surface, wherein the polynomial equation expresses the resource usage as a tenth-degree polynomial function of hour of day and temperature, with each independent variable having a highest degree of six, the polynomial equation having a set of calculated coefficients;
determine a future load on a component of the electrical utility system at a particular temperature and hour of day by applying the calculated coefficients to the coordinate values for the particular temperature and hour of day; and
modify a component of the electrical utility system based on the determined future load.

14. The method of claim 13, wherein the polynomial equation defines the resource usage coordinate value by application of the coefficients to the coordinate values for hour of day and temperature.

15. The method of claim 13, wherein the plurality of sequential events totals a number of events in the range between 24 and 600000.

16. The method of claim 13, wherein the load is one or more of customer load, transformer load, feeder load, and substation load.

17. The method of claim 13 wherein the component is one or more of a breaker, a switch, a recloser, a fuse, a sectionalizer, a customer meter, a service transformer, a circuit/feeder (part or whole), a spot secondary-network, a secondary-network grid, a primary-network, a substation bus, a substation, a substation power transformer, a transmission/sub-transmission line, a transmission network, a planning area, a generator, a generation facility, sets of generation facilities, a utility system or an interconnected system of utility systems.

18. The method of claim 13, wherein the tenth-degree polynomial function is:

$$z=B0+B1 \cdot x+B2 \cdot x^2+B3 \cdot x^3+B4 \cdot x^4+B5 \cdot x^5+B6 \cdot x^6+B7 \cdot y+$$
$$B8 \cdot x \cdot y+B9 \cdot x^2 \cdot y+B10 \cdot x^3 \cdot y+B11 \cdot x^4 \cdot y+B12 \cdot x^5 \cdot y+$$
$$B13 \cdot x^6 y+B14 \cdot y^2+B15 \cdot x \cdot y^2+B16 \cdot x^2 \cdot y^2+B17 \cdot x^3 y^2+$$
$$B18 \cdot x^4 \cdot y^2+B19 \cdot x^5 \cdot y^2+B20 \cdot x^6 \cdot y^2+B21 \cdot y^3+$$
$$B22 \cdot x \cdot y^3+B23 \cdot x^2 \cdot y^3+B24 \cdot x^3 \cdot y^3+B25 \cdot x^4 \cdot y^3+$$
$$B26 \cdot x^5 \cdot y^3+B27 \cdot x^6 \cdot y^3+B28 \cdot y^4+B29 \cdot x \cdot y^4+$$
$$B30 \cdot x^2 \cdot y^4+B31 \cdot x^3 \cdot y^4+B32 \cdot x^4 \cdot y^4+B33 \cdot x^5 \cdot y^4+$$
$$B34 \cdot x^6 \cdot y^4,$$

wherein Bs are the calculated coefficients.

* * * * *